United States Patent Office 3,032,526
Patented May 1, 1962

3,032,526
CONDENSATION PRODUCT OF m-PHENYLENE-DIAMINE AND A DIALKYL KETONE EPOXY RESIN COMPOSITION CONTAINING SAME, AND PROCESS OF CURING
Carl Mayn Smith, St. Paul, Minn., and David E. Graham, Westfield, N.J., assignors to General Aniline & Film Corporation, New York, N.Y., a corporation of Delaware
No Drawing. Filed July 7, 1958, Ser. No. 746,614
7 Claims. (Cl. 260—42)

This invention relates to polyglycidyl ethers of polyhydric alcohols, commonly and hereinafter referred to as epoxy ether resins, and particularly to a new class of curing composition for said resins.

It is well known that epoxy ether resins are useful in the manufacture of varnishes, enamels, molding compositions, adhesives, films, fibers, molded articles, and the like. In order to cure or harden such epoxy ether resins and compositions containing them, various types of curing agents have been proposed such as alkalies, carboxylic acids and anhydrides, Friedel-Crafts metal halides, and particularly amines. From a practical commercial standpoint, the curing or hardening agents generally used are aliphatic polyamines or aromatic polyamines. The aliphatic polyamines suffer from the disadvantage in many applications of epoxy resins that the resulting hardening resin has a rather low heat distortion resistance and have the additional disadvantage that once mixed with the epoxy ether resin the pot life of the resulting mixture is extremely short. As a result, the aromatic polyamines, particularly metal-phenylenediamine have heretofore found the widest use as hardening agents for epoxy ether resins and yield cross-linked resins with somewhat higher heat distortion temperatures than the aliphatic polyamines, and also when initially mixed with the epoxy ether resin yield a composition with somewhat longer usable pot life. The aromatic polyamines are not, however, without certain disadvantages. In particular, they are highly toxic so that considerable care must necessarily be employed in using them and in addition they tend to be rather unstable on storage, thus necessitating considerable care in shipping and selection of containers, etc.

I have now found that condensation products of meta-phenylenediamine and di- lower alkyl ketones, e.g. acetone, methylethylketone, and particularly methyl-isobutyl-ketone which are obtained by condensing in the presence of small amounts of a strong acid catalyst a ketone of the above type with meta-phenylenediamine in molar ratios of at least 1 mole of ketone per mole of m-phenylenediamine and are particularly valuable as hardeners for curing compositions for epoxy ether resins. These compositions have the advantage that they are relatively non-toxic and have good stability on storage as compared with aromatic polyamines, e.g. meta-phenylenediamine, and when mixed with epoxy ether resins yield a composition having an improved pot life and on curing produce a hardened resin having an improved heat distortion temperature.

These novel meta-phenylenediamine-ketone condensation products prepared in accordance with the present invention are particularly adaptable for the curing of epoxy ether resins characterized by the following general formulae:

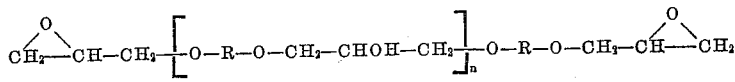

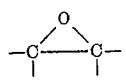

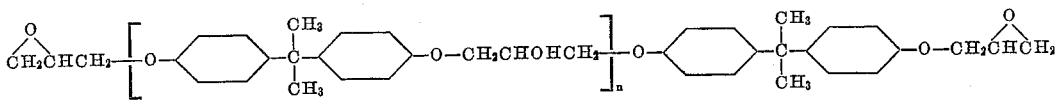

wherein R represents the divalent hydrocarbon radical of the dihydric phenol and $n$ represents the extent of copolymerization as determined by the epoxy equivalent which ranges from 140 to 4000. By the epoxy equivalency is meant the average number of 1,2-epoxy groups contained in the average molecule. It is expressed in the trade as the grams of the polymeric material or resin containing one gram equivalent of epoxide. We particularly prefer for practice of the present invention those epoxy ether resins having an epoxide equivalent within the range of 140–290.

The liquid epoxy ethers are obtained by the procedures described in United States Patents 2,500,600; 2,633,458; 2,642,412; 2,324,483; 2,444,333; 2,520,145; 2,521,911 and 2,651,589; all of which are incorporated herein by reference for examples of the types of epoxy ether resins that may be employed for curing with our crosslinking agents (hardeners).

Of the several types epoxy ether resins with varying epoxide equivalents, we prefer to employ those having an epoxide equivalent ranging between 140–165 and 225–290, preferably between 190–210 because of its low melting point 8–12° C. (as determined by Durran's mercury method) and ease of formulation.

The novel epoxy ether hardening or curing compositions of the present invention are as stated readily prepared in good yield by heating advantageously to reflux with a small amount of strong acid a mixture of meta-phenylenediamine and ketone of the general formula

wherein R and R' each represent lower alkyl groups of from 1 to 9 carbon atoms, a total number of carbon atoms in R and R' being not more than 10, until the desired degree of condensation has been effected. It is advantageous to employ a substantial excess of the ketone and to remove such excess on completion of a desired degree of the condensation by steam or vacuum distillation. I have found that products useful as epoxy ether resin hardeners are obtained when any ketone of the formula given above is employed with unique and particularly valuable products being obtained when the ketone used in the preparation is methyl-isobutylketone in substantial excess as the products obtained in this instance are complex liquid products which when mixed with epoxy ether resins and cured give hard resins having particularly desirable properties as will be more fully pointed out below, and also have the advantage that they are particularly easy to compound with epoxy ether resins due to the fact that they are liquids.

The details of the preparation of the curing agents of the present invention will be apparent from the following specific examples thereof.

EXAMPLE 1

In a 1-liter, 3-necked flask fitted with thermometer and reflux condenser and set on a steam bath was charged 150 g. m-phenylene diamine (1.40 moles) 500 cc., 396 g. (6.83 moles) acetone and 5 drops concentrated hydrochloric acid (or other strong acids). This solution was heated to reflux (63–65° C.) and held at reflux for 24 hours. The major part of the acetone was then distilled off under a vacuum of about 200 mm. To complete the removal of volatile acetone self-condensation products the residue was then heated in an oil bath held at 150° C. under a vacuum of 1.0 to 0.5 mm. for one hour. The reaction product amounting to 259 g. was a resin with a deep brownish-red color. When cold it could be ground to a free flowing powder which retained its free flowing characteristics for several months.

The foregoing experiment was repeated and the yield of 257 g. of resin was obtained. The resin obtained in these two experiments were combined by melting together and on cooling the combined sample was ground to a fine powder.

Casting mixes were then prepared with a commercial epoxy ether resin having an epoxy equivalent of 190–210 (Shell Chemical Co. Epon–828 resin) in the following manner. In 50 cc. beakers, 9.25 g. portions of the epoxy ether resin were mixed with portions of the above m-phenylenediamine-acetone resin varying from 1.5 g. through 6.0 g. in 0.5 g. increments. The m-phenylenediamine-acetone curing agent was brought into solution in the epoxy ether resin by heating to 105–110° C. with stirring. During the mixing very little exothermic reaction was noticed. Each of the thus prepared casting mixes was then poured into a numbered aluminum weighing dish and cured at 85° C. for 16 hours. Cure was relatively slow at this temperature, but all samples were hard at the end of the above period. Each of the samples was then subjected to a post cure of 6 hours at 170° C. Following this post cure only those cups containing 2.5, 3.0 and 3.5 g. of the m-phenylenediamine-acetone curing agent per 9.25 g. of epoxy ether resin were hard at 170° C.

Bar castings were then prepared by dissolving in a similar manner varying concentrations of the above m-phenylenediamine-acetone curing agent in the above epoxy ether resin. These castings were cured for 12 hours at 85° C. followed by a post cure for 6 hours at 180° C. The amount of m-phenylenediamine-acetone curing agent per 18.5 g. of epoxy ether resin used in preparing the casting mix for these bar castings and the heat distortion temperature of the thus obtained bar castings are shown in the following table:

*Table I*

| Bar # | g. agent per 18.5 g. "828" | Heat distortion temperature, °C. |
| --- | --- | --- |
| A | 5.0 | 161 |
| B | 5.5 | 184 |
| C | 6.0 | 184 |
| D | 6.5 | 181 |

EXAMPLE 2

In a 1 liter, 3-necked flask fitted with a thermometer, stirrer and water separator topped by a reflux condenser and set in preheated oil bath was charged 216 g. m-phenylenediamine 2.00 moles (ex plant recent production). 200 g. methyl isobutyl ketone (2.00 moles) 10 g. 1,3-benzene disulfonic acid.

Refluxing with separation of an aqueous phase in the water tray began quickly; the temperature of the reaction mixture was raised from 125° to 218° over 2 hours. During the last 20 minutes of heating, inert gas was passed through the reaction flask to sweep out unreacted methyl isobutyl ketone and its self-condensation products.

The aqueous distillate amounted to 33.7 g.; the organic distillate to 17 g. The product was poured into a dish and amounted to 356 g. On cooling it formed a pasty, brown semicrystalline mass.

In 50 cc. beakers, 9.25 g. portions of epoxy ether resin having an epoxide equivalent of 190–210 (Shell Chemical Co. Epon–828 resin) was mixed with 2.0 g. and 2.5 g. portions of the above m-phenylenediamine-acetone curing agent by heating to 105–110° C. and stirring until the curing agent was dissolved in the resin. The thus prepared mixtures were poured into aluminum weighing dishes and cured for 16 hours at 85° C. followed by a post curing of 6 hours at 180° C. Both castings were hardened at the end of this period.

EXAMPLE 3

In a 1 liter, 3-necked flask suitably fitted was charged 216 g. m-phenylenediamine, 10 g. 1,3-benzene disulfonic acid, 250 g. methyl isobutyl ketone. The mixture was heated in an oil bath over 1 hour 20 minutes to a flask temperature of 177° C. removing the water formed by the condensation with a suitable separator under the reflux condenser. At this point the addition of 250 g. more methyl isobutyl ketone was begun requiring 1 hour 20 minutes to complete. The reaction mixture was heated for 45 minutes after completing the addition of the methyl isobutyl ketone. The final flask temperature was 222° after sweeping with inert gas for 10 minutes. Aqueous distillate collected=84.5 g. Yield of product=590 g. of very viscous deep red brown liquid. This product was still liquid after storage for 2 months at ambient temperatures.

In 50 cc. beakers, 9.25 g. portions of epoxy ether resin having an epoxide equivalent of 190–210 (Shell Chemical Co. Epon–828 resin) were mixed with portions of the above obtained m-phenylenediamine-methyl isobutyl ketone curing agent varying from 1.5 g. through 6.5 g. in 0.5 g. increments. As the curing agent was a liquid, the mixing was readily effected at room temperature. The thus obtained casting mix was then poured into numbered aluminum weighing dishes and cured at 85° C. for 16 hours followed by post curing of 6 hours at 180° C. at which temperature all the casts were rubbery. On cooling, those casts containing 3.0, 3.5, 4.0 and 4.5 g. of the curing agent respectively were the hardest as well as the toughest.

Bar castings were then prepared by adding to 18.5 g. portions of the above epoxy ether resin, the amount of above hardening agent shown in the table below. The bar castings were cured 16 hours at 85° C. and 6 hours at 150° C. The amount in grams of the above curing agent added per 18.5 g. of epoxy ether resin as well as the heated distortion temperature of the casting are shown in Table II below.

*Table II*

| Bar # | g. agent per 018.5 g. "828" | Heat distortion temperature |
| --- | --- | --- |
| A | 7.0 | so brittle it shattered on trying to remove from mold. |
| B | 7.5 | 122° |
| C | 8.0 | 121° very flat HDT response to change in concentration; of advantage in formulations. |
| D | 8.5 | 118° |
| E | 9.0 | 115° |

From consideration of the above examples it will be apparent that the meta-phenylenediamine-ketone curing agents of this invention yield castings having a very flat heat distortion temperature response to changes in concentration and the amount of curing agent employed. They are thus particularly valuable in production of casting mixes since greater variations in the amount of the curing agent used can be tolerated when formulating them with epoxy ether resins without adversely affecting the properties of the cured resin. It has also been found that these resins are much less toxic than meta-phenylenediamine. It has also been found that those curing agents obtained by the condensation of meta-phenylenediamine with methyl isobutyl ketone which are liquid are particularly valuable due to the ease with which they can be incorporated into the epoxy other resin to be hardened while at the same time retaining the non-toxic and storage stability characteristics of the meta-phenylenediamine-ketone condensates of this invention.

We claim:

1. A heat curable composition comprising a heat curable glycidyl polyether of a dihydric phenol having an epoxide equivalent within the range of 140–290 in admixture with a curing amount of cross-linking composition consisting essentially of the resinous products obtained by condensing at least 1 mole of a dialkyl ketone in which the total number of alkyl carbon atoms is from 2 to 10 with 1 mole of meta-phenylenediamine in the presence of a small amount of strong acid.

2. A heat curable composition as defined in claim 1 wherein the cross-linking composition specified is condensation product of acetone and meta-phenylenediamine.

3. A heat curable composition as defined in claim 1 wherein the cross-linking composition specified is a condensation product of methyl isobutyl ketone and meta-phenylenediamine.

4. A process of hardening a glycidyl polyether of a dihydric phenol having an epoxy equivalent within the range of 140–290 which comprises incorporating in such an epoxy ether resin a curing amount of a cross-linking composition comprising a resinous condensation product obtained by condensing at least 1 mole of a dialkyl ketone in which the total number of carbon atoms is from 2 to 10 with 1 mole of meta-phenylenediamine in the presence of a small amount of strong acid.

5. A process as defined in claim 4 wherein the cross-linking composition specified is the resinous condensation product of acetone and meta-phenylenediamine.

6. A process as defined in claim 4 wherein the cross-linking composition specified is the condensation product of methyl isobutyl ketone with meta-phenylenediamine.

7. A novel composition of matter useful as a cross-linking composition for a glycidyl polyether of a dihydric phenol having an epoxide equivalent within the range of 140–290 consisting essentially of the liquid resinous condensation products of about 2.5 moles of methyl isobutyl ketone with about 1 mole of meta-phenylenediamine in the presence of a small amount of strong acid.

References Cited in the file of this patent

UNITED STATES PATENTS

| | | |
|---|---|---|
| 2,000,040 | Semon et al. | May 7, 1935 |
| 2,659,712 | Thompson et al. | Nov. 17, 1953 |
| 2,801,229 | De Hoff et al. | July 30, 1957 |
| 2,839,487 | Rosamilia et al. | June 17, 1958 |

FOREIGN PATENTS

| | | |
|---|---|---|
| 794,165 | Great Britain | Apr. 30, 1958 |